May 19, 1970     J. A. SAFFIR     3,513,123
ADHESIVE DENTAL FILLING
Filed Oct. 11, 1967

INVENTOR
JACOB A. SAFFIR

BY *Sherman & Shalloway*
ATTORNEY

United States Patent Office 3,513,123
Patented May 19, 1970

3,513,123
ADHESIVE DENTAL FILLING
Jacob A. Saffir, Los Angeles, Calif., assignor, by mesne assignments, to Dentsply International Inc., York, Pa., a corporation of Delaware
Filed Oct. 11, 1967, Ser. No. 674,487
Int. Cl. C08g 51/04; C08k 1/02
U.S. Cl. 260—37                                 9 Claims

ABSTRACT OF THE DISCLOSURE

An adhesive dental filling composition to be employed in the filling of cavities in teeth, said dental filling composition comprising an intimate admixture of a non-toxic epoxy resin and a dental alloy or amalgam. A preferred metallic alloy is composed principally of silver and tin and an amalgam is prepared by admixing such an alloy with mercury. The employment of such an adhesive dental filling composition allows the dentist to fill a cavity without the use of any mechanical device to create retention between the tooth and the filling material or any special geometrical undercuts to create such retention.

The present invention is directed to an adhesive dental filling composition and, more particularly, to such an adhesive dental filling composition comprising the product resultant from an admixture of an epoxy resin and a dental alloy or amalgam.

The adhesiveness of dental filling materials has long presented a problem in the dental industry and profession.

Past and present dental filling materials have either had very temporary adhesive properties or none at all for sealing themselves to the tooth structure. Thus for example, a conventional dental amalgam is a good example of a filling material that has no adhesiveness at all in any stage of its use.

In the past, various attempts have been made to overcome this lack of adhesiveness in conventional dental filling materials. Thus for example, various attempts to improve the retention between the dental filling material and the tooth have involved the use of mechanical retention means between the filling and the tooth or a special geometrical relationship between the filling and the tooth structure. For example, various attempts have been made to improve the retention between a conventional dental filling material and the tooth structure by the employment of a pin or other suitable anchor which is placed within the tooth cavity in an attempt to retain the dental filling material within the tooth. In a similar manner, a special geometric shape, that is, an undercut has been made within the tooth cavity in a further attempt to increase retention.

All of these various attempts to improve the retention means for holding a dental filling in the tooth structure have involved considerable expense and/or labor and loss of tooth structure. In addition, these previous attempts have not produced the desired adhesiveness between the dental filling material and the tooth. Previous attempts to improve the retention of dental filling material within the tooth structure have not been successful, and there is a frequent tendency for the dental filling material to become loose or be dislodged from the tooth structure.

Until the development of the present invention a satisfactory adhesive dental filling composition had not been produced. However, in accordance with the present invention, it is possible to produce an adhesive dental filling composition by providing the material resultant from an intimate admixture of an epoxy resin and a dental alloy or amalgam.

It is therefore a principal object of the present invention to provide a novel dental filling composition which eliminates the inherent deficiencies of previously employed non-adhesive compositions.

It is a further object of the present invention to provide a dental filling composition which is characterized by possessing all of the essential properties of an advantageous dental filling material and in addition, is adhesively retained in or attached to the tooth structure.

A further object of the present invention comprises a novel adhesive dental filling composition resultant from an intimate admixture of an epoxy resin and a dental alloy or amalgam.

Further objects and advantages of the novel dental filling composition of the present invention will become more apparent from the following more detailed description of the present invention and the accompanying drawings wherein.

Figure 1:
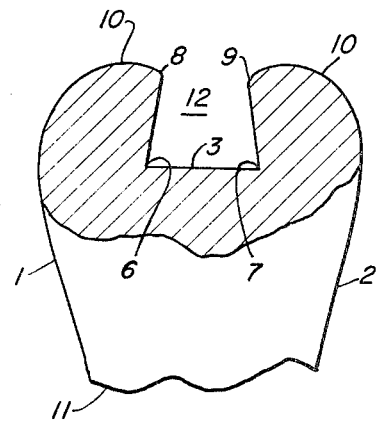
FIG. 1 is a cross-sectional view of an occlusal cavity preparation for the use of conventional prior art dental filling materials.

In addition to exhibiting all of the essential properties of a conventional dental filling material produced from a dental amalgam etc. the adhesive dental filling composition of the present invention has the additional advantage of providing adhesion between the filling material and the tooth structure. In this way, any leakage between the tooth wall and the filling which may be present in a conventional dental filling is eliminated. This means the elimination of the probability of caries developing.

While not wishing to be bound by any particular theory, it has been hypothesized that when the resultant product of the intimate admixture of epoxy resin and dental alloy or amalgam is introduced into a dental cavity in a natural tooth, the affinity of the dental alloy materials for each other or the mercury for the silver powder in the dental amalgam is great and throughout the filling material such affinity is sufficient to tend to extrude some of the epoxy resin factor and force this extruded epoxy resin toward the outer boundary of the filling material which is adjacent the wall of the cavity where the adhesiveness is desired and required.

In addition, it has been hypothesized that the simultaneous occurrence of the hardening or curing of the epoxy resin and the amalgamation of the mercury and silver of the dental amalgam produces an interaction between these two simultaneous processes which results in a final product substantially enhanced over the properties of the epoxy resin or dental alloy or amalgam alone. In this respect, the final filling material produced from the intimate admixture of the epoxy resin and dental alloy or amalgam is less brittle than the conventional amalgam. Similarly, it has been found that the ability of the filling material of the present invention, when cured, to resist abrasion is highly increased over the ability of a conventional dental amalgam. This may be due in part to the fact that the dental alloy or amalgam acts to some extent as a catalyst in the process of curing the epoxy resin.

EPOXY RESIN

The organic portion of the filling composition of the present invention can comprise any of the known epoxy resins. Thus, the adhesive dental filling composition of the present invention can contain any of the known resinous organic compounds containing at least one epoxy group i.e.,

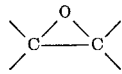

the only requisite characteristics of the epoxy resin to be employed in the composition of the present invention is that such resin should have the requisite adhesiveness so as to create adhesion between the filling composition and the tooth structure and such epoxy resin be one which is relatively nonirritating to the tooth structure and surrounding gum area.

These compounds may be saturated or unsaturated, aliphatic, cycloaliphatic, aromatic, or heterocyclic and may contain substituents such as halogen atoms, OH groups, ether radicals and the like.

Generally, such epoxide resins comprise a polyether derivative of a polyhydric organic compound, said derivative containing 1,2-epoxy groups and said compound being selected from the group consisting of polyhydric alcohols and phenols containing at least two phenolic hydroxy groups. Such resins are commonly referred to as glycidyl polyethers.

Among the polyhydric phenols which may be used in preparing such glycidyl polyethers are the mononuclear phenols such as resorcinol, catechol, hydroquinone, etc. and the polynuclear phenols, such as bis(4-hydroxyphenol)-2,2-propane, 4,4'-dihydroxybenzophenone, bis-(4-hydroxyphenyl)-1,1-ethane, bis(4-hydroxyphenyl)-1,1-isobutane, bis(4-hydroxyphenyl)-2,2-butane, bis(4-hydroxy-2-methylphenyl)-2,2-propane, bis(4-hydroxy-2-tertiary butylphenyl)-2,2-propane, bis(4-hydroxy-2,5-dichlorophenyl)-2,2-propane, 4,4'-dihydroxybiphenyl, 4,4'-dihydroxypentachlorobiphenyl, bis(2-hydroxynaphthyl)-methane, 1,5-dihydroxy naphthalene, phloroglucinol, 1,4-dihydroxynaphthalene, 1,4-bis-(4-hydroxyphenyl) cyclohexane, etc. as well as other complex polyhydric phenols such as pyrogallol, phloroflucinol and novalac resins from the condensation of a phenol with an aldehyde in the presence of an acidic condensation catalyst. For the nature and preparation of novalac resins, see the book by T. S. Carswell, "Phenoplasts," 1947, page 29, et. seq.

The preferred polynuclear phenol is bis(4-hydroxyphenyl)-2,2-propane, known in the trade as bisphenol-A.

In admixture with the named polynuclear phenols, use also may be made of those polynuclear phenols wherein the phenol nuclei are joined by sulfur bridges, as for example, in 4,4'-dihydroxydiphenyl sulfone.

Additionally polyethers of aliphatic polyhydric alcohols, such as the polyglycidyl ethers thereof, as for example, the diglycidyl ethers of ethylene glycol, propylene glycol, trimethylene glycol, butylene glycol, diethylene glycol, 4,4'-dihydroxydicyclohexyl, glycerol, dipropylene glycol and the like, as well as ethers containing more than two glycidyl groups such as the glycidyl polyethers, glycerol mannitol, sorbitol, polyallyl alcohol, polyvinyl alcohol and the like can be used.

These epoxy resins, glycidyl polyethers as they are frequently called, may be prepared by reacting predetermined amounts of at least one polyhydric compound and one epihalohydrin in an alkaline medium. While it is preferred to employ epichlorohydrin as the epihalohydrin in the preparation of the epoxy materials of the present invention, other epihalohydrins such as epibromohydrin may be used advantageously.

In the preparation of these epoxy resins, aqueous alkali is employed to combine with the halogen of the epihalohydrin. The amount of alkali employed should be substantially equivalent to the amount of halogen present and, preferably, should be employed in an amount somewhat in excess thereof. Aqueous mixtures of alkali metal hydroxides, such as potassium hydroxide and lithium hydroxide, may be employed; although for economic reasons, sodium hydroxide is obviously preferred. All of these procedures are well known in the art for the production of glycidyl ethers.

Glycidyl polyethers are disclosed in various places in the art; among the references which may be mentioned are: U.S. Pats. 2,324,483; 2,444,333; 2,494,295; 2,500,600; 2,503,726; 2,511,913; 2,518,056; 2,558,949; 2,579,698; 2,582,985; 2,592,560; 2,615,007; 2,615,008; 2,633,458; 2,716,099; 2,801,227; 2,801,989; 2,806,016; 2,840,541; 2,841,595; 2,851,825; 2,857,362; 2,865,887; 2,879,259; 2,910,455; 2,965,611; 2,986,551; 2,986,552; 2,995,583; 3,004,951; 3,013,087; 3,015,647; 3,017,387; 3,033,803; 3,033,816; 3,033,818; 3,033,820; 3,033,821; 3,061,588; 3,069,434; 3,074,974; 3,092,610; 3,095,429; 3,102,874; 3,123,586; 3,219,670; 3,232,993; 3,285,862; 3,297,519; 3,298,998; 3,299,169; 3,309,339; 3,313,775; 3,317,470; and 3,325,452.

A full description of these glycidyl ether type of epoxy resins can be found in the Handbook of Epoxy Resins, Lee and Neville, McGraw-Hill, 1967.

Another group of epoxy resins that may be used in the composition of the present invention comprises those epoxy resins derived by the reaction product of an olefin or polyolefin with an epoxidizing material. Thus, for example a typical reaction involves the reaction of peracetic acid and unsaturated compounds such as polybutadiene. A typical member of this class of epoxy resin is derived from butadiene and crotonaldehyde which have undergone the Diels-Alder condensation and the Tischenko reaction. Other epoxidized olefins such as epoxidized polybutadiene resins are described in various patents such as U.S. Pat. 2,829,135.

Still another group of epoxide resins are the polyepoxide polyesters which are prepared by epoxidizing the unsaturated portions of the tetrahydrophthalic residues in the polyester composition. These polyepoxide polyester compositions, as well as their preparation, are described in U.S. Pat. 2,847,394.

Another group of epoxide resins are those produced by the epoxidation of an ester of a higher fatty acid, e.g. by the reaction of an ester of a higher fatty acid with hydrogen peroxide and acetic acid in the presence of an acid cation exchange resin such as nuclear sulfonic and phenolic methylene sulfonic cation exchange resins. Such epoxide resins and their preparation are more fully described in U.S. Pat. 2,919,283.

All of these epoxy resins are also fully described in the Handbook of Epoxy Resins, Lee and Neville, McGraw-Hill, 1967.

All of the epoxy resins described above are well known in the art and, are sold under various trade names. Included among these for example are: Epon 815, Epon 820, Epon 828, Epi-Rez 504, Epi-Rez 509, Epi-Rez 510, Epi-Rez 6001, ERL 2774, Epon 1001, Epon 1004, Epon 1007, EP 201 etc.

Numerous examples of curing agents which may be used with the compositions of the present invention and which are known to those skilled in the art for curing epoxy resins are for example various amines such as aliphatic and aromatic primary, secondary and tertiary amines, e.g. diethylamine, mono-, di- and tri-butylamines, octylamine, dodecyl amine, cyclohexylamine, benzylamine, benzyl dimethyl amine, piperidine, piperazine, etc.; polyamines, e.g. m-phenylene diamine, p-phenylene diamine, 4,4'-methylenedianiline, m-xylenediamine, 4,4'-diaminodiphenyl sulfone, 4,4'-methylene dianiline-diaminodiphenyl sulfone blends, ethylene diamine, N,N-diethylene diamine, diethylene triamine, triethylene tetramine, tetraethylenepentamine, pentaethylene diamine, etc.; oxy-amines such as ethanolamine, butanolamine, diethanolamine, triethanolamine, etc.; hydroxy-alkylated polyamines, such as 2-aminoethylethanolamine, N-hydroxyethyl-1,2-diamino propane, 1,3-diaminopropanol, N-hydroxypropyl-m-phenylene diamine, N-(2-hydroxypropyl)-ethylene diamine, N,N'-bis(hydroxyethyl) triethylene triamine, N-(hydroxyethyl) diethylene triamine, etc.; phenolic tertiary amines, such as dimethylaminomethylphenol, tris(dimethylaminomethyl)phenol, etc; the salts of phenolic tertiary amines, such as the 2-ethyl-hexanoic acid salt of tris(methylaminomethyl)phenol, etc., aliphatic amine-adducts, such as diethylene triamine, 4,4'-isopropylene diphenol adduct, diethylene triamine/acrylonitrile adduct, acrylonitrile/tetraethylene pentamine adduct, etc;. cyanamide and its polymerization products, e.g. dicyandiamide; primary carboxylic acid amides and polyfunctional carboxylic acid amides, e.g. acetamide, adipamide, benzamide, diacetamide of hexamethylene diamine, etc.

These nitrogen-containing curing agents are disclosed in various places in the art; among the references which may be mentioned are: U.S. Pats. 3,023,190; 3,029,286; 3,036,975; 3,228,911; 3,256,239; 3,278,460; 3,280,043; 3,297,608; 3,303,165; 3,306,309; 3,310,529; and 3,316,185.

Additional curing agents which may be employed for the curing or hardening of the epoxy resins employed in the adhesive dental filling composition of the present invention include for example organic and inorganic acids and anhydrides e.g. citric acid, acetic acid, aconitic acid, oxalic acid, succinic acid, succinic anhydride, dodecylsuccinic anhydride, lactic acid, maleic acid, maleic anhydride, fumaric acid, phthalic acid, phthalic anhydride, pyromellitic dianhydride, hexachloroedomethylene tetrahydrophthalic anhydride, hexahydrophthalicanhydride, methyl endomethylene tetrahydrophthalic anhydride, 1,2,4-butanetricarboxylic acid, isophthalic acid, terephthalic acid, acetoacetic acid, malonic acid etc.

These acids and anhydrides employed for the curing or hardening of epoxy resins are also disclosed in various places in the art; among the references which may be mentioned here are: U.S. Pats. 3,012,979; 3,242,142; 3,264,261; 3,281,495; 3,296,202; 3,326,850; 3,336,260.

The polyamine curing agents and the organic dianhydride curing agents are the most suitable curing agents to be employed in the adhesive dental filling composition of the present invention. Some of these curing agents require no heat to effect the hardening or curing of epoxy resin, since the addition of the curing agent at room temperature is sufficient to allow a hardening of the resin material while others require a slight heating upon addition of the hardening or curing agent to initiate the hardening or curing of the epoxy resin. While some of these curing agents are obviously more suitable than others in the curing of the various epoxy resins which can be employed in the novel adhesive dental filling composition of the present invention, it has been found that hardening agents of the hydroxy ethyl diethylenetriamine type are particularly preferred materials. This is true since these materials are completely non-irritating and non-sensitizing and thus can be used in any amounts in the novel composition of the present invention. A material of this nature is therefore employed in the preferred embodiment of the present invention.

The amount of hardening or curing agent that is employed in conjunction with the epoxy resin in the adhesive dental filling composition of the present invention depends largely upon the type of resin and catalyst that is employed. In general however, the catalyst is employed in an amount which varies from about 2% to 50% or more by weight based on the weight of the resin. It is of course obvious that lesser or greater amounts can be employed where desired for particular purposes.

DENTAL ALLOY OR AMALGAM

The dental alloy or amalgam employed in the novel adhesive dental filling composition of the present invention can be any of the conventional dental alloys or amalgam materials employed for the filling of teeth. It is noted in this respect however, that these dental amalgam or alloy materials which are conventionally employed as dental fillings lack the adhesive characteristics of the composition of the present invention which comprises in combination an epoxy resin and a dental alloy or amalgam. The chemical composition of the dental alloy that can be suitably employed in the adhesive dental filling composition of the present invention generally comprises a major percentage of silver with minor amounts of tin, copper, zinc and other additional metals. Of this latter group of metals incorporated within the conventional dental alloy, zinc is employed in the largest percentage. Conventional dental alloys usually contain not less than 65% silver, not less than 25% tin, not more than 6% copper, and not more than 2% zinc. Preferably, the dental alloy contains from about 67% to 70% silver, from 25% to 29% tin, from 3% to 5% copper, and less than 1% zinc. To these metals may be added small amounts of other metals such as beryllium, gallium, indium, germanium, palladium, or gold in order to modify the properties of either the alloy or an amalgam made from such alloy. These additional metals added in small amounts are generally added for the purpose of modifying the color and/or the expansion characteristics of the dental alloy or amalgam during hardening.

The above percentages for the various components of the dental alloy to be incorporated in the adhesive dental filling composition of the present invention are of course only exemplary and lesser or greater amounts of any or all of the individual components of the dental alloy could be used for particular purposes wherein different properties are desired.

In preparing a dental amalgam to be employed in the adhesive dental filling composition of the present invention, the dental alloy described above is mixed with mercury in an amalgamation process. While the respective amounts of mercury and dental alloy that can be employed in the production of the conventional dental amalgam vary over wide limits, the dental amalgam employed in the adhesive dental filling composition of the present invention is generally prepared by admixing 1 part by weight of mercury to 1 part by weight of alloy up to 10 parts by weight of mercury to 1 part by weight of the dental alloy. Within this range, it has been found that exceptional dental amalgam to be employed in the adhesive dental filling composition of the present invention can be prepared by admixing mercury with the dental alloy at a ratio of about 8 parts by weight of the mercury to 5 parts by weight of the alloy.

ADMIXTURE OF EPOXY RESIN AND DENTAL ALLOY OR AMALGAM

In preparing the novel adhesive dental filling composition of the present invention an intimate admixture of the epoxy resin and dental alloy or amalgam is prepared. In general, the epoxy resin is admixed with the dental alloy or amalgam in a range of from about 0.1% to about 25% by weight of the mixture. Preferably, the epoxy resin comprises from about 2% to about 10% of the adhesive dental filling composition of the present invention with a composition comprising about 5% of the epoxy resin and 95% of the dental alloy or amalgam being a particularly preferred embodiment of the present invention. Again, the limits set forth above merely describe the suitable bounds for most applications and, lesser or greater amounts of the resin can be advantageously employed where desired for particular purposes.

Since the epoxy resins employed in the novel composition of the present invention usually require a few more minutes to harden or cure than does the dental amalgam, it is advantageous to allow the epoxy resin to cure for a short period of time prior to admixing the same with the dental alloy or amalgam. In this way, it is possible to prepare a composition which will require a time for hardening which is no longer than the hardening time of a conventional dental amalgam. Thus for example, when the epoxy resin employed in the novel composition requires approximately 12 minutes for setting and a conventional dental amalgam requires approximately 6 minutes for setting, the epoxy resin should be admixed with the hardening or curing agent and allowed to stand initially for 6 minutes prior to incorporating such epoxy resin into the composition containing the dental alloy or amalgam. In this way, the composition which is employed to fill the dental cavity will require only a total of 6 minutes to cure, the same time that the conventional dental amalgam requires if employed alone as the filling material. Depending upon the particular choice of resin, the dentist can determine the length of time required to allow the epoxy resin to stand prior to admixing the same with the dental alloy or amalgam.

While it is advantageous to prepare the composition in this manner it is of course possible to admix the epoxy resin and dental alloy or amalgam without allowing the epoxy resin to partially cure or harden prior to its incorporation into the adhesive dental filling composition of the present invention. In operating in this manner however, it will be necessary to allow the dental filling composition to remain undisturbed in the patient's mouth for a slightly longer period of time so as to allow a complete curing or hardening of the epoxy resin. This is because of the necessity of filling the tooth with the novel composition of the present invention prior to a complete hardening or setting of the dental amalgam.

As noted previously, it is hypothesized that the simultaneous curing or hardening of the epoxy resin and the dental amalgam or alloy allows for the preparation of an adhesive filling composition having properties vastly superior to either the dental amalgam material or alloy or epoxy resin material if employed alone as the dental filling.

Where the dental amalgam and the epoxy resin are admixed prior to any preliminary partial curing of the epoxy resin, it has been found that the best technique for admixing the materials of the novel adhesive dental filling composition of the present invention is to first mix the dental alloy and mercury to produce the amalgam and subsequently adding the epoxy resin.

Referring to the drawings wherein like numerals represent like elements throughout the different figures, all of the figures illustrate an enlarged sectional view bucco-lingually of the crown portion of an upper bicuspid illustrating the buccal portion 1, the lingual portion 2, the occlusal portion 10, and the gingival portion 11.

FIG. 1 illustrates the preparation of a cavity 12 for the employment of prior art filling materials which are not adhesive and require retention means so that the filling can be held in place. The cavity 12 illustrated in FIG. 1 is shaped like a trapezoid with the longer base 3 at the bottom. The angles 8–6–7 and 6–7–9 are acute angles and help to form undercut portions useful in the retaining of the dental filling within the tooth cavity. These undercut portions which must be put in for the retention of the dental filling material of the prior art are generally drilled out of healthy tooth structure sacrificed for the need of holding the nonadhesive filling compositions of the prior art in place. Thus, in employing prior art filling compositions the dentist has to remove not only the decayed portion of the tooth but also portions of the healthy tooth structure so as to produce the required geometric configuration necessary for retaining the conventional dental filling composition of the prior art within the cavity.

Figure 2:
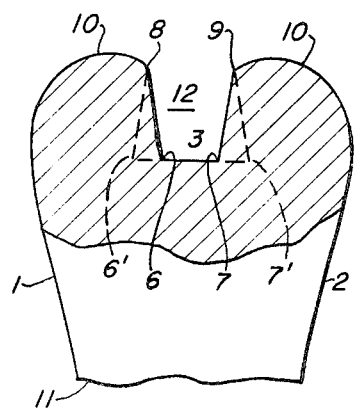
FIG. 2 is a cross-sectional view of an occlusal cavity preparation for use with the adhesive dental filling composition of the present invention.

As indicated in FIG. 2, the cavity 12, while also a trapezoid, has its base 8–9 on the occlusal surface and the angles 8–6–7 and 6–7–9 are obtuse angles. This type of arrangement can be conveniently employed with the novel adhesive dental filling composition of the present invention. In this way, as can be seen from an examination of the cavity 12 of FIG. 2 that as a result of the adhesiveness of the filling composition of the present invention the natural tooth structure can be conserved. Thus, for example, in relation to the tooth shown in FIG. 2 the portion 8–6'–6 and the portion 9–7'–7 which is sacrificed in the production of the undercuts employing a conventional dental filling composition are not sacrificed when employing the adhesive composition of the present invention. Thus, it is not necessary to sacrifice healthy tooth structure for the purpose of retaining the dental filling within the tooth cavity but, such retention of the dental filling is achieved by the employment of the adhesive dental filling composition of the present invention.

Figure 3:
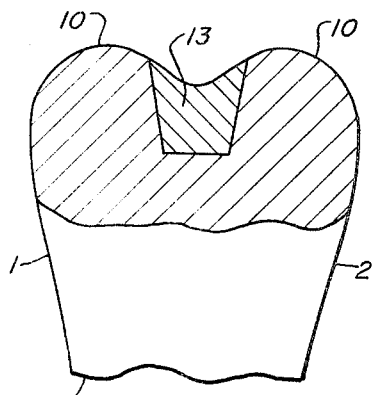
FIG. 3 is a further cross-sectional view of the occlusal cavity preparation of FIG. 2 wherein the cavity has been filled with the dental filling composition of the present invention.
Figure 4:
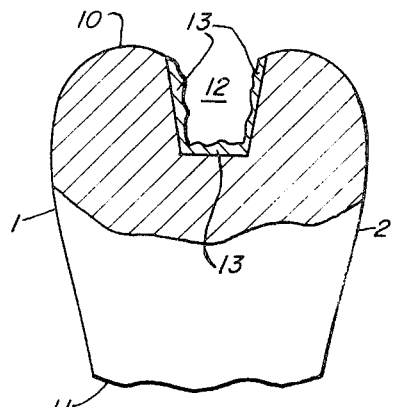
FIG. 4 is a further cross-sectional view of an occlusal cavity preparation for use of the adhesive dental filling composition of the present invention as a partial filling.

FIG. 3 shows the tooth cavity of FIG. 2 filled with the adhesive dental filling composition 13 of the present invention, while FIG. 4, illustrates only a partial filling of the cavity 12 of FIG. 2 with the adhesive dental filling composition 13 of the present invention. In this figure, the adhesive dental filling composition 13 of the present invention has been used only to partially fill the cavity along the walls, that is, to fill those areas wherein the adhesiveness is most desirable. The remainder of the cavity 14 shown in FIG. 4 can be filled with any other conventional filling material. Thus for example, the remainder of the cavity can be filled with any conventional filling material such as dental alloy or amalgam or a synthetic type dental filling material such as the well known acrylic resins and the silicate filling materials.

Figure 5:
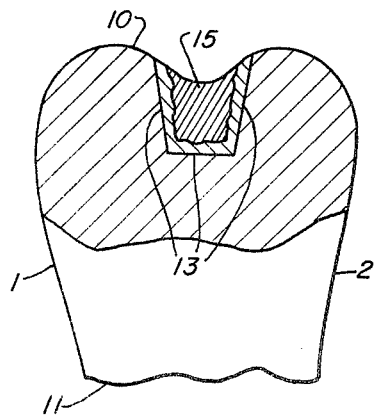
FIG. 5 is a further cross-sectional view of the occlusal cavity preparation of FIG. 4 wherein the filling has been completed.

In FIG. 5, the tooth cavity of FIG. 4 is shown after the filling has been completed. The dental filling composition 13 of the present invention is again shown as a partial filling on the walls of the cavity while the remainder of the cavity is filled with any other conventional dental filling material 15. Since the problems of leakage and dislodgment of the filling material occur between the tooth structure and such a filling material, by employing the adhesive dental filling composition of the present invention as a partial filling on the walls of the caries, the advantageous properties associated with the adhesive dental filling composition of the present invention are still retained even though the remainder of the cavity is filled with another filling material.

Figure 6:
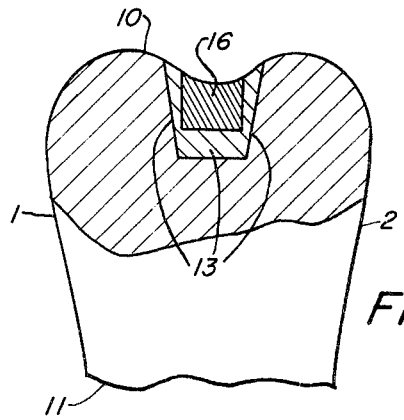
FIG. 6 is a further cross-sectional view showing another method of filling an occlusal cavity employing the adhesive dental filling composition of the present invention.

FIG. 6 also illustrates the employment of the dental filling composition 13 of the present invention as a partial filling on the walls of the cavity. Here however instead of the employment of a convention filling material to fill the remainder of the cavity, the remainder of the cavity is filled with a porcelain insert 16. In lieu of porcelain however, another suitable material such as, for example, gold, platinum, etc. can be utilized. The use of porcelain however, allows for the production of a much more esthetic filling. Because the adhesive dental filling composition of the present invention produces adhesion both between the filling composition 13 and the tooth structure as well as between the filling composition 13 and the porcelain insert 16, the embodiment shown in FIG. 6 produces a very retentive and esthetic filling.

While the above figures all illustrate the employement of the novel adhesive dental filling composition of the present invention in the filling of a tooth cavity, it is of course obvious that the novel composition of the present invention can be employed to repair an old conventional filling such as for instance wherein a conventional filling has been partly chipped or broken away or where there is evidence of new decay which does not require removal of the entire filling material. In such circumstances, the dentist merely has to remove all of the decay and add the novel composition of the present invention to rebuild the tooth.

The following examples illustrate various embodiments of the present invention. It is to be understood however, that such examples are for purposes of illustration only and the present invention is in no way to be deemed as limited thereto.

Example 1

An adhesive dental filling composition was prepared by admixing 5 parts by weight of a glycidyl ether type of epoxy resin prepared by the reaction of epichlorhydrin and Bisphenol A (E.R.L.-2774—Union Carbide and Carbon Company), the epoxy resin composition being prepared by admixing 75% by weight of the glycidyl ether epoxy resin and 25% by weight of a hardener comprising hydroxyethyl diethylenetriamine, and 95 parts by weight of a dental alloy comprising the following composition:

| Component: | Percentage by wt. |
|---|---|
| Silver | 69.3 |
| Tin | 26.3 |
| Copper | 3.6 |
| Zinc | 0.8 |

In applying the above prepared adhesive dental composition, the dentist prepared a tooth cavity as shown in FIG. 2, employing no special geometric configuration such as an undercut portion to create retention between the filling composition and the tooth structure. The adhesive dental filling composition comprising admixed epoxy resin and dental alloy was then used to fill the tooth cavity in a conventional manner.

The epoxy resin within the dental filling composition is then allowed to cure in place for approximately 8 to 12 minutes so as to provide a hard dental filling material having no tendency to be dislodged or allow leakage between the tooth structure and the dental filling.

On examination, teeth filled with the adhesive dental filling composition of the present invenion showed that the adhesive composition of the present invention substantially prevented leakage from occurring around the filling in the restoration area and, that no tendency for the filling to dislodge occurred. This is not the case however, wherein a conventional dental filling material is employed without the aid of special mechanical or geometrical devices to aid the retention of the filling composition.

This therefore, illustrates the unusual and unexpected characteristics of the adhesive dental filling composition of the present invention. It is noted that the retentive characteristics and the strength of the adhesive dental filling composition of the present invention comprising in combination an epoxy resin and a dental alloy or amalgam is greater than would be obtained by the use of either material alone or by the use of the epoxy resin as a liner with the dental alloy or amalgam forming the body of the filling. In this respect, it is hypothesized again that the employment of a material resultant from the intimate admixture of epoxy resin and dental alloy or amalgam produces results superior to those that would be expected by the mere combination of materials due to the curing of the admixture in situ.

Example 2

An epoxy resin composition was prepared again by producing a mixture of 79 parts of epoxy resin E.R.L.-2774 and 21 parts of a polyamine epoxy hardener comprising hydroxyethyl diethylenetriamine. The composition was allowed to partially cure for approximately 6 minutes after which time the epoxy resin had hardened to the point at which a tacky composition was prepared. Some 15 parts of the partially cured epoxy resin were then added to a dental amalgam prepared by amalgamating the dental alloy of Example 1 with mercury, the ratio of mercury to alloy being 8 parts of mercury to 5 parts of alloy.

The composition was then employed to fill a cavity in a tooth in the same manner as set forth in Example 1 above. Since the epoxy resin had been partially cured prior to its admixture with the dental amalgam, the final composition comprising an intimate admixture of the epoxy resin and the dental amalgam took only approximately 6 minutes to cure in place within the tooth cavity. Therefore, by allowing the epoxy resin to partially cure or harden prior to admixing the same with the dental amalgam, it was possible to produce an intimately admixed composition which required no longer to harden in place than the conventional amalgam material.

Here again, after examination over an extended period of time the dental filling composition of the present invention showed no tendency to be dislodged from its place in the tooth cavity and, showed no signs of allowing leakage between the tooth structure and the filling.

Example 3

Example 1 was repeated employing, in lieu of the epoxy resin composition employed in Example 1, an epoxy resin composition prepared by mixing a commercial epoxidized olefin type of epoxy resin comprising the reaction product derived from butadiene and crotonaldehyde sold at EP201 and a hardener comprising triethylenetetramine, the epoxy resin comprising 60% by weight of the epoxy resin composition with the hardener comprising 40% by weight.

Upon admixture of such epoxy resin composition with the dental alloy and employment of the intimately admixed epoxy resin and dental alloy in the filling of a dental cavity as shown in Example 1, again, a very retentive, strong filling was prepared.

Example 4

The procedure of Example 2 was repeated utilizing an amalgam prepared by amalgamating mercury with a dental alloy having the following composition:

| Material: | Parts by wt. |
|---|---|
| Silver | 72.4 |
| Tin | 26.0 |
| Copper | 1.2 |
| Zinc | 0.4 |

The amalgam was prepared by amalgamating mercury and the dental alloy in a ratio of 4 parts by weight mercury to 1 part by weight of the dental alloy.

Again, as in Example 2, the epoxy resin composition was allowed to partially cure for a period of approximately 6 minutes prior to admixing the same with the dental amalgam. By allowing the epoxy resin to partially cure, the final composition comprising intimately admixed epoxy resin and dental amalgam took approximately 6 minutes to cure in place within the tooth cavity. This is approximately the length of time required for the curing or hardening of a conventional dental amalgam filling material.

Again, by employing the material resultant from the intimate admixture of epoxy resin and dental amalgam in accordance with the present invention it was possible to produce an adhesive dental filling composition having no tendency to be dislodged or to allow leakage between the tooth structure and filling without the employment of any mechanical or geometrical retention means.

While the present invention has been described primarily with respect to the intimate admixture of only the organic material, e.g., epoxy resin and inorganic material, e.g. a dental alloy or amalgam, it is of course obvious that other conventional additive materials can be conveniently incorporated into the adhesive dental filling composition of the present invention. These include for example, various pigments utilized to prepare a more esthetic dental filling.

While various embodiments of the present invention have been illustrated by way of specific examples, it is to be understood that the present invention is in no way to be deemed as limited thereto but should be construed as broadly as all or any equivalents thereof.

I claim:
1. An adhesive dental filling composition comprising a material resultant from an intimate admixture of an epoxy resin and a material selected from a dental alloy or dental amalgam, said epoxy resin comprising from about 0.1 to about 25% by weight of the composition.

2. The composition of claim 1 wherein said dental alloy comprises an alloy comprising at least 65% silver, at least 25% tin, not more than 6% copper, and not more than 2% zinc and said dental amalgam comprises the product of the amalgamation of mercury and said dental alloy in a ratio of from about 1:1 to about 10:1.

3. The composition of claim 2 wherein said epoxy resin comprises a glycidyl ether type epoxy resin containing a polyamine hardening agent in an amount of from about 2% to about 50% by weight based on the epoxy resin.

4. The composition of claim 3 wherein said epoxy resin comprises the reaction product of Bisphenol A and epichlorohydrin and said hardening agent comprises hydroxyethyl diethylenediamine.

5. An adhesive dental filling composition comprising a material resultant from an intimate admixture of an epoxy resin comprising the reaction product of Bisphenol A and epichlorohydrin and a dental amalgam prepared by amalgamating mercury and a dental alloy comprising at least 65% silver, at least 25% tin, not more than 6% copper, and not more than 2% zinc in a ratio of mercury to dental alloy of from 1:1 to 10:1, said epoxy resin comprising from about 0.1 to about 25% of the composition.

6. The composition of claim 5 wherein said dental amalgam is the product of the amalgamation of mercury and said dental alloy in a ratio of about 8 parts by weight mercury to about 5 parts by weight alloy.

7. The composition of claim 6 wherein the epoxy resin comprises about 5% by weight of the composition.

8. A method of preparing an adhesive dental filling composition which comprises partially curing an epoxy resin and admixing said partially cured epoxy resin with a dental amalgam or alloy so that the admixed composition will take no longer to harden when employed as a filling than would the dental amalgam alone, said epoxy resin comprising from about 0.1 to about 25% by weight of the composition.

9. The method of claim 8 wherein said dental amalgam comprises the product of the amalgamation of mercury and a dental alloy comprising at least 65% silver, at least 25% tin, not more than 6% copper, and not more than 2% zinc, the ratio of mercury to dental alloy being from about 1:1 to about 10:1, and said epoxy resin comprises glycidyl ether type of epoxy resin containing a polyamine hardening agent in an amount of from about 2% to about 50% by weight based on the epoxy resin.

References Cited

UNITED STATES PATENTS

| 1,612,782 | 12/1926 | Vogt et al. | 75—169 X |
| 3,194,784 | 7/1965 | Bowen. | |
| 3,327,016 | 6/1967 | Lee | 106—35 X |

FOREIGN PATENTS 228,949   10/1958   Australia.

MORRIS LIEBMAN, Primary Examiner

L. T. JACOBS, Assistant Examiner

U.S. Cl. X.R.

106—35